United States Patent
Turkelson et al.

(10) Patent No.: US 8,503,797 B2
(45) Date of Patent: Aug. 6, 2013

(54) AUTOMATIC DOCUMENT CLASSIFICATION USING LEXICAL AND PHYSICAL FEATURES

(75) Inventors: Adam Turkelson, Lansdale, PA (US); Huanfeng Ma, Drexel Hill, PA (US)

(73) Assignee: The Neat Company, Inc., Philadelphia, PA (US)

( * ) Notice: Subject to any disclaimer, the term of this patent is extended or adjusted under 35 U.S.C. 154(b) by 1311 days.

(21) Appl. No.: 12/205,613

(22) Filed: Sep. 5, 2008

(65) Prior Publication Data

US 2009/0067729 A1 Mar. 12, 2009

Related U.S. Application Data

(60) Provisional application No. 60/970,132, filed on Sep. 5, 2007.

(51) Int. Cl.
*G06K 15/00* (2006.01)

(52) U.S. Cl.
USPC .......................................... 382/224; 358/1.18

(58) Field of Classification Search
None
See application file for complete search history.

(56) References Cited

U.S. PATENT DOCUMENTS

| | | | | |
|---|---|---|---|---|
| 3,051,309 A * | 8/1962 | Leathers | ................. | 209/554 |
| 4,166,540 A * | 9/1979 | Marshall | ................. | 209/555 |
| 4,171,744 A * | 10/1979 | Hubbard | ................. | 209/586 |
| 5,017,763 A * | 5/1991 | Shepard | ................. | 235/432 |
| 5,159,667 A * | 10/1992 | Borrey et al. | ................. | 715/205 |
| 5,414,781 A * | 5/1995 | Spitz et al. | ................. | 382/296 |
| 5,438,657 A * | 8/1995 | Nakatani | ................. | 715/223 |
| 5,926,392 A * | 7/1999 | York et al. | ................. | 700/223 |
| 5,999,664 A * | 12/1999 | Mahoney et al. | ................. | 382/305 |
| 6,236,768 B1 * | 5/2001 | Rhodes et al. | ................. | 382/306 |
| 6,377,956 B1 * | 4/2002 | Hsu et al. | ................. | 1/1 |
| 6,408,084 B1 * | 6/2002 | Foley | ................. | 382/101 |
| 6,442,555 B1 * | 8/2002 | Shmueli et al. | ................. | 1/1 |
| 6,502,081 B1 * | 12/2002 | Wiltshire et al. | ................. | 706/12 |
| 6,731,784 B2 * | 5/2004 | Yang | ................. | 382/135 |
| 6,826,724 B1 * | 11/2004 | Shimada et al. | ................. | 715/234 |
| 6,892,193 B2 | 5/2005 | Bolle et al. | | |
| 7,016,536 B1 * | 3/2006 | Ling et al. | ................. | 382/190 |
| 7,069,240 B2 | 6/2006 | Spero et al. | | |
| 7,194,471 B1 * | 3/2007 | Nagatsuka et al. | ................. | 1/1 |
| 7,233,708 B2 | 6/2007 | Li et al. | | |
| 7,370,059 B2 * | 5/2008 | Geraud | ................. | 1/1 |
| 7,529,408 B2 * | 5/2009 | Vohariwatt et al. | ................. | 382/180 |
| 8,024,304 B2 * | 9/2011 | Pulfer et al. | ................. | 707/694 |
| 2002/0062249 A1 * | 5/2002 | Iannacci | ................. | 705/14 |
| 2005/0134935 A1 | 6/2005 | Schmidtler et al. | | |
| 2005/0168766 A1 * | 8/2005 | Troyansky et al. | ................. | 358/1.14 |

OTHER PUBLICATIONS

Manning, et al., "Foundations of Statistical Natural Language Processing", Chapter, 15, pp. 539-544, Jun. 18, 1999.

* cited by examiner

*Primary Examiner* — Manav Seth
(74) *Attorney, Agent, or Firm* — Woodcock Washburn LLP

(57) ABSTRACT

An automatic document classification system is described that uses lexical and physical features to assign a class $c_i \in C\{c_1, c_2, \ldots, c_i\}$ to a document d. The primary lexical features are the result of a feature selection method known as Orthogonal Centroid Feature Selection (OCFS). Additional information may be gathered on character type frequencies (digits, letters, and symbols) within d. Physical information is assembled through image analysis to yield physical attributes such as document dimensionality, text alignment, and color distribution. The resulting lexical and physical information is combined into an input vector X and is used to train a supervised neural network to perform the classification.

48 Claims, 10 Drawing Sheets

AUTOMATIC DOCUMENT CLASSIFICATION USING LEXICAL AND PHYSICAL FEATURES

CROSS REFERENCE TO RELATED APPLICATION

This application claims priority under 35 U.S.C. §119(e) to U.S. Provisional Patent Application No. 60/970,132 filed Sep. 5, 2007. The contents of that provisional patent application are hereby incorporated by reference.

TECHNICAL FIELD

The invention relates to methods of classifying documents that are scanned into a computer. More specifically, the invention relates to the field of document processing for supervised and unsupervised machine learning of categorization techniques based on disparate information sources such as lexical information and physical features of the source document. The invention also relates to combining these disparate information sources in a coherent fashion.

BACKGROUND

Methods of document classification typically rely solely on lexical features of a document. In the book entitled *Foundations of Statistical Natural Language Processing*, authors Manning and Schutze provide a comprehensive review of classification procedures for text documents. None of the methods cited therein use the physical characteristics of the source documents when classifying them. However, such physical information about the source documents can be very valuable in categorizing the documents correctly, particularly when the documents may be of disparate types and sizes. So, rather than simply relying on the lexical features of the documents, the present invention is designed to increase the accuracy of classification by using both the physical and lexical features of the document in its classification schema. Such an approach has not been found in the art.

U.S. Pat. No. 6,892,193 relates to a system that combines different modalities of features in multimedia items. Specifically, multimedia information (media items) from disparate information sources, such as visual information and a speech transcript, are processed for supervised and unsupervised machine learning of categorization techniques. The information from these disparate information sources is combined in a coherent fashion. However, the kinds of features that are used in this system for classification can not be used in classification of text-based documents and certainly do not include features relating to the physical characteristics of the information sources.

U.S. Pat. No. 7,233,708 describes a method for indexing and retrieving images using a Discrete Fourier Transformations associated with the pixels of a picture to find statistical values associated with the textural attributes of the pixels. This method also does not take into consideration lexical or physical aspects of the information source.

US Patent Publication No. 2005/0134935 describes a method for delineating document boundaries and identifying document types where the graphical information of each image is used by a machine learning algorithm to learn classification rules to predict the document or subdocument type of the image. The machine learning algorithm may learn classification rules for each image based on the textual information in the image obtained by optical character recognition. Additionally, the output of these two such classifiers may be combined to produce a single output score from them or combined into one feature space and one machine learning algorithm that uses all features simultaneously to construct document or subdocument classification rules. However, this system also does not use physical properties of the document to improve classification.

Accordingly, the advantages of using the physical properties of the document to aid in the classification of the document are not known in the art.

SUMMARY

The following presents a simplified summary of the invention in order to provide a basic understanding of the invention. This summary is not intended to identify key, critical elements of the invention or to delineate the scope of the invention. Its sole purpose is to present some concepts of the invention in a simplified form, as an introduction to the details supplied later in the claims and figures.

The present invention improves upon the most common systems of digital document imaging and classification. It addresses the ambiguity of current feature selection methods used for document classification by leveraging physical information about documents in conjunction with the lexical information most often used for classification. Once a digital image of an electronic or physical document is received, all available physical information about that document is collected, either directly from an analog-to-digital converter, such as a scanner, or extrapolated from an intermediate two dimensional format, such as a digital photo. The image data is run through both an OCR engine and a physical feature analyzer. Textual information from the document is then run through a computational process that selects relevant features of the text. The physical data extracted from the document image are analyzed for several physical features helpful to document classification, such as size, colorfulness, and margin smoothness. The physical feature analysis results are joined with the results of the lexical feature selection in a single matrix. After the matrix is produced, a classification algorithm is used to classify the documents.

The invention is particularly directed to methods, computer readable storage media, and systems for classifying a scanned document by extracting physical attributes of the scanned document and classifying the scanned document based on the extracted physical attributes of the scanned document. An input vector is created from the extracted physical attributes and provided to a processing system, such as a neural network, to train the processing system to classify the document from one or more features of the input vector.

In exemplary embodiments, extracting the physical attributes of the scanned document comprises cropping and/or rotating the scanned document as needed to create a processed scanned document for feature extraction. Sample physical document attributes extracted by the exemplary method include the size of the document, margin smoothness of the document, colorfulness of the document, whether the document is an inverse image, whether the scanned document is in a portrait or a landscape orientation, whether the document includes a logo, a text/non-text ratio of the document, and the like. The extracted physical attributes are collected for the input vector and at least one physical attribute is selected from the collected physical attributes to describe a target class of the scanned document. Sample target classes include a receipt, a business card, or a letter. The selected physical attribute and target class are then identified to the neural network. Lexical features may also be extracted from the scanned document in the conventional fashion and combined with the extracted physical attributes into a unified set of features that are provided to the neural network for classifying the scanned document.

DETAILED DESCRIPTION OF ILLUSTRATIVE EMBODIMENTS

Preferred embodiments of the invention will be described in detail below with reference to FIGS. 1-6. Those skilled in the art will appreciate that the description given herein with respect to those figures is for exemplary purposes only and is not intended in any way to limit the scope of the invention. All questions regarding the scope of the invention may be resolved by referring to the appended claims.

Figure 1:
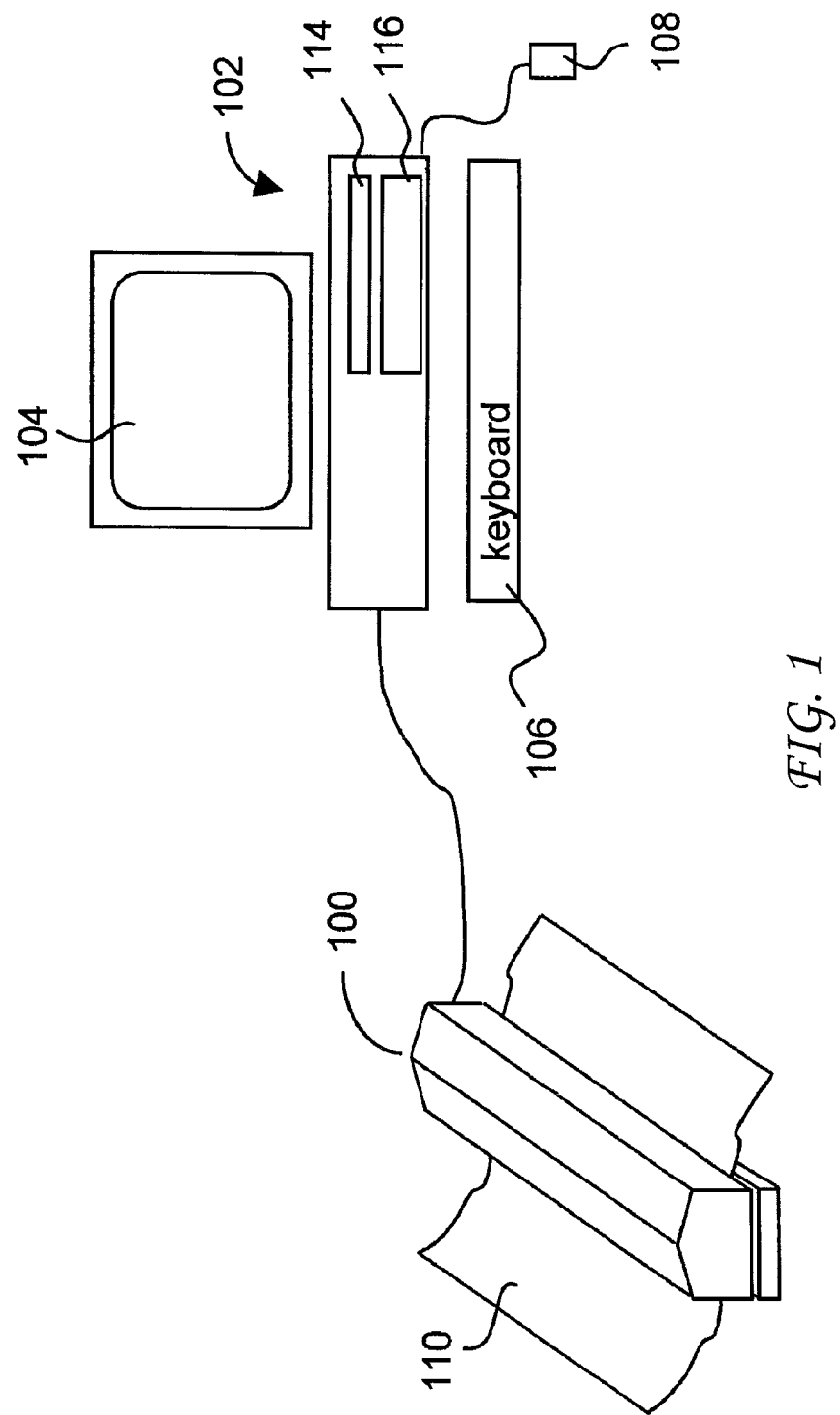
FIG. 1 illustrates a schematic diagram of a portable scanning system that may be adapted to scan documents for classification using the techniques of the invention.

FIG. 1 illustrates a schematic diagram of a portable scanning system that may be adapted to scan documents for classification using the techniques of the invention. As illustrated, sheet-fed scanner 100 is connected through communication cable 112 to a computing device 102, which may be a desktop or laptop computer, for example. Scanner 100 scans a sheet 110, which may be a sheet of paper, a receipt, a business card, or the like, and digitizes the text and graphics thereon in a conventional manner. The scanning result is generally a grayscale digital image that is transferred to the computing device 102 through communications cable 112. The digital image may then be manipulated by one or more computer programs executed by computing device 102. The computer program(s) executed by computing device 102 may implement various aspects of the claimed method as explained below.

The computing device 102 includes a display monitor 104 on which the scanned image or manipulated image is displayed to users. Computing device 102 may optionally include a memory slot 114, a disk drive 116 for storing image files and application program files, and a keyboard 106 for providing data input. A mouse 108 is also provided to permit execution of commands by the computing device 102.

Figure 2:
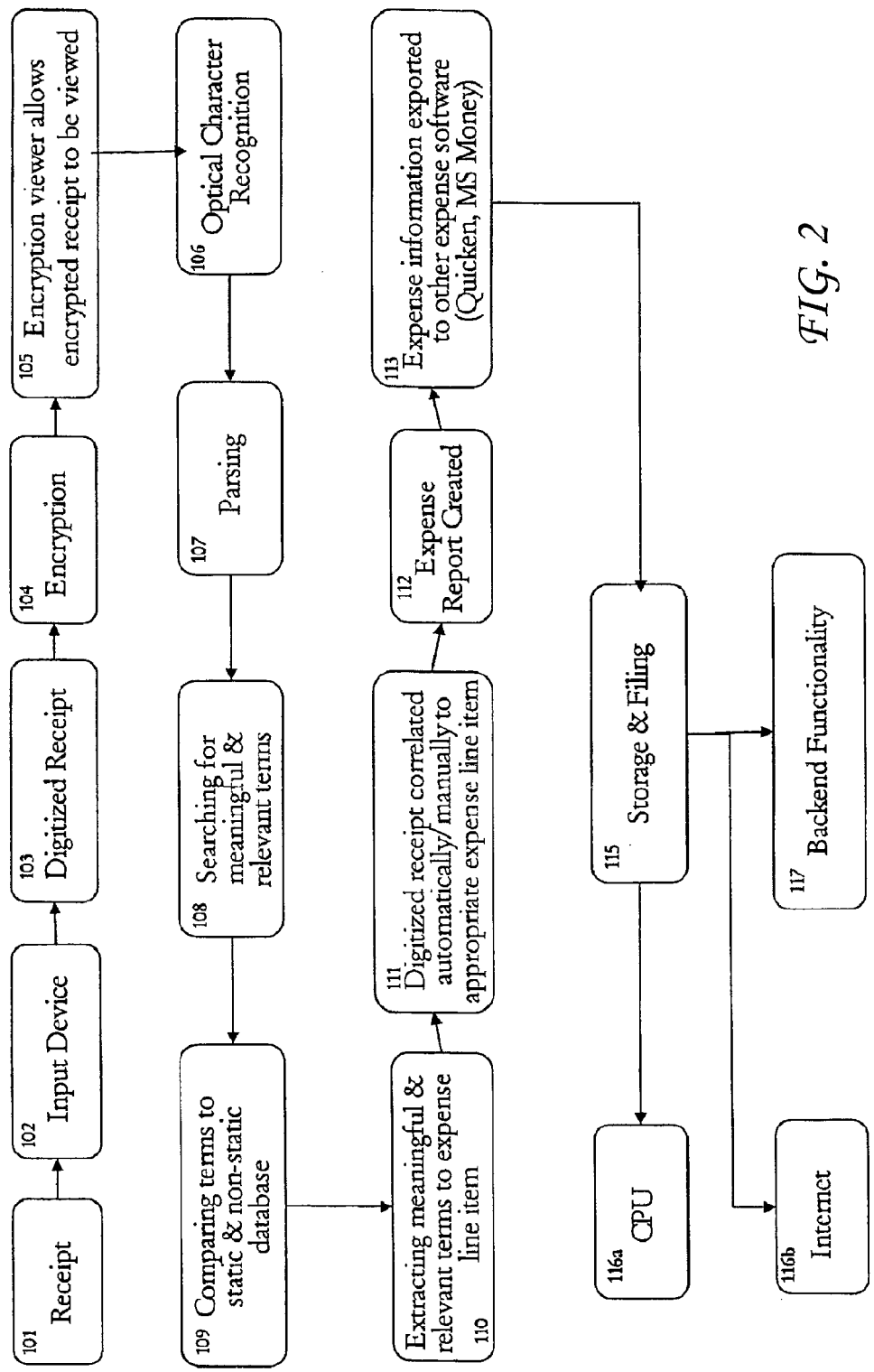
FIG. 2 illustrates a functional block diagram of an exemplary system for capturing, storing and processing documents for classification using the techniques of the invention.

In an exemplary embodiment, the computer program executed by the computing device 102 of FIG. 1 analyzes the grayscale images received from the scanner 100, converts the images to text, analyzes the text data, extracts expense data, and puts the extracted expense data into an expense report. In another exemplary embodiment, the computer program executed by the computing device 102 of FIG. 1 analyzes business card images or other documents images received from the scanner 100, converts the images to text, analyzes the text data, extracts contacts data, and puts the contacts data into a contacts database. FIG. 2 illustrates a functional block diagram of an exemplary system of the type described in U.S. Pat. No. 7,069,240 for capturing, storing and processing documents, such as receipts and business cards, for classification using the techniques of the invention. The contents of that patent are hereby incorporated by reference in their entirety.

FIG. 2 illustrates an embodiment for processing (and classifying) a receipt using the techniques of the invention. As illustrated in FIG. 2, the process begins with a document such as a paper expense receipt 201 of the type typically printed by a cash register or other point of sale device used by merchants. An input device 202, such as scanner 100 of FIG. 1, creates a digitized representation of the image of the receipt or other document 203. Preferably, the scanned document is encrypted 204 to prevent any tampering with the scanned image. For example, a proprietary encryption methodology may be used that can only be subsequently viewed by a compatible viewer 205. After the digital image is received by the computing device 102, the image data may be converted into alpha-numeric strings 206 using software routines such as optical character recognition (OCR) and/or image character recognition (ICR) for handwriting recognition. Such software routines are well-known in the art and will not be described further herein. The process of converting the image into alpha-numeric data may also include image enhancement techniques such as noise filtering, contrast enhancement, edge filtering, sharpening, and other techniques not described here. Preferably, the OCR/ICR process also preserves some of the spatial information with respect to where the text is on the receipt so as to facilitate parsing of the alpha-numeric text at 207 in order to find particular information. The parsing may identify certain text such as the date and amount (where the document is a receipt) and also look for the vendor name. Also, the document may be searched for meaningful terms and values at 208. For example, if the document is a receipt, the receipt may be searched for common terms at 208. Because most receipts possess similar information, the software may search the receipt text for a list of common terms within the receipt text, such terms including, for example, "amount," "total amount," and/or "amount due." The receipt text may also be searched for known date formats. The software may also utilize a static and non-static database of popular vendors at 209 to facilitate the filing of the expense description category in an expense report. For example, if the receipt reads McDonalds, then the software may recognize that McDonalds is a restaurant and automatically select meals from the expense description category in the expense report. Once the software locates the terms within the receipt text, the corresponding dollar amount or other relevant data (date, location, etc.) is extracted at 210 and placed into the appropriate expense report line item category and correlated to an expense line item at 211 to build an expense report at 212. The information in the expense report may also be imported into other popular expense software such as Quicken and MS Money at 213 and may be customized to interact with specific corporate systems including storage and filing system 214, processor 215a, Internet connection 215b, and backend system 216.

In accordance with the invention, processing of the digitized document received from scanner 100 may also include classification of the document. For example, the document may be classified as a receipt, a business card, a letter, or the like. The document may also be further classified as a particular type of receipt from a particular vendor, a business card from a particular vendor, or the like. Techniques for such classification are described below with respect to FIGS. 3-6.

As noted above, extracting lexical properties from text is known to those having ordinary skill in the art of natural language processing. For example, Manning and Schutze in their book *Foundations of Statistical Natural Language Processing* describe a wide variety of methods of extracting lexical features from text. In an exemplary embodiment of the invention, a Vector Space Model is used to extracting lexical properties by combining the term frequency and the document frequency into a single weight vector.

In accordance with the invention, however, physical features are also extracted from document images, such features usually reflecting the physical attributes of the original document. However, before extracting physical features related to the physical structure of the document, the images are preferably pre-processed to remove factors of scanning. Important pre-processing operations include cropping and rotation, for example. It should be noted that the physical features are distinct from graphical information. For example, while graphical information encompasses the way content is organized and displayed within the document, physical features useful for document classification include document size, document colorfulness, margin smoothness, document orientation, image inversion, existence of logos, text/non-text ratios, thickness of paper, level of crumbling of the paper, shadowing, and the like. This list of physical features is used for illustrative purposes and is not intended to be limiting.

In exemplary embodiments, the physical features are extracted from the document using contact image sensors (CIS) in a scanner 100 passed over a document. A person having ordinary skill in the art of scanning technology will know how to process the data from the CIS sensor to create a digital representation of the document. The digital representation of the image is then processed in order to extract the physical properties of the document. In an alternate embodiment, a separate set of sensors can be used to detect some of the physical features of the document. In yet another alternate embodiment, the source of the document can be used as a way of detecting the size of the document. For example, a scanner may have multiple slots that accommodate paper of different sizes. Knowing which slot a given document was scanned from can be used as an indicator for the size of the document.

The physical and lexical feature matrices are combined into a single feature matrix through joining the individual data fields per sample in the respective sets into a single training sample. Once joined, the data is filtered for outliers and normalized for faster and more accurate training of the neural network for classifying the document.

Lexical Feature Selection

The fundamental problem with relying on textual information for document classification as in the prior art is the high dimensionality of the data. For example, if $D=\{d_1, \ldots, d_n\}$ is a set of documents that contain $W=\{w_1, \ldots, w_n\}$ words such that $W \subset D$ then typical encoding of a document combines term frequency $tf_{i,j}$ and document frequency $df_i$ into a single weight vector TFIDF (commonly referred to as the Vector Space Model) as follows:

$$weight(i, j) = \begin{cases} (1 + \log(tf_{i,j}))\log\frac{N}{df_i} & \text{if } tf_{i,j} \geq 1 \\ 0 & \text{if } tf_{i,j} = 1 \end{cases}$$

This encoding, while meaningful, increases in size with each unique term found in each document. This growth results in noisy high dimensional data that is not cleanly or reliably separable through typical machine learning algorithms (especially as the number of categories and documents grows). A common approach to decreasing the dimensionality of data is known as feature selection.

Feature selection, as it relates to document classification, is the process of selecting key features from the input vector that best describe the target classes. This can be accomplished through a variety of automated algorithms (PCA, IG, $x^2$-test, etc.) In an exemplary embodiment, OCFS (Orthogonal Centroid Feature Selection) is used.

OCFS attempts to optimize the objective function of an Orthogonal Centroid (OC) subspace learning algorithm in discrete solution space. The standard Orthogonal Centroid method uses a vector space representation of n vectors in an m-dimensional space:

$$A=[a_1, \ldots, a_n] \in \mathbb{R}^{m \times n}$$

The data in matrix A is clustered into r clusters as:

$$A=[A_1, A_2, \ldots, A_r] \text{ where } A_i \in \mathbb{R}^{m \times n_i} \text{ and}$$

$$\sum_{i=1}^{r} n_i = n$$

The OC algorithm is formally described as:

Algorithm 1

Orthogonal Centroid Method

Given a data matrix $A \in \mathbb{R}^{m \times n}$ with r clusters and a data point $x \in \mathbb{R}^{m \times 1}$, it computes a matrix $Q_r \in \mathbb{R}^{m \times r}$ and gives an r-dimensional representation $\hat{x}=Q_r^T x \in \mathbb{R}^{r \times 1}$.

1: Compute the centroid $c_i$ of the ith cluster for $1 \leq i \leq r$.
  2: Set the centroid matrix $C=[c_1, c_2, \ldots, c_r]$.
  3: Compute an orthogonal decomposition of C, which is $C=Q_r R$.
  4: $\hat{x}=Q_r^T x$ gives an r-dimensional representation of x.

OCFS expresses this as an optimization problem:

$$\arg\max_{\tilde{W} \in H^{d \times p}} J(\tilde{W}) = \arg\max \text{trace} (\tilde{W}^T S_b \tilde{W}) \text{ subject to}$$

where $\tilde{W}$ belongs to space $H^{d \times p}$. The OCFS algorithm is then defined as:

Algorithm 2

Orthogonal Centroid Feature Selection

1: Compute the centroid $m_i, i=1, 2, \ldots, c$ of each class for training data.
  2: Compute the centroid m of all training samples.
  3. Compute feature score $$s(i) = \sum_{j=1}^{c} \frac{n_j}{n}(m_j^i - m^i)^2$$

for all the features.

4. Find the corresponding index set K consisted of the p largest ones in set $S=\{s(i) \ 1 \leq i \leq d\}$.

Using this algorithm a subset of features from the input matrix is selected that has maximized the sum of distances between all the class means. The feature subset provides cleaner separation boundaries making it easier for a machine learning algorithm to converge with desirable results. As noted below, the feature subset of the input matrix may also be modified in accordance with the invention to also include physical features of the input document.

Physical Feature Selection

Different from semantic and lexical features that are based on the textual content of documents, the invention further extracts physical features from document images, where such physical features usually reflect the physical attributes of the original document. This process will be explained below with reference to FIG. 3.

Figure 3:
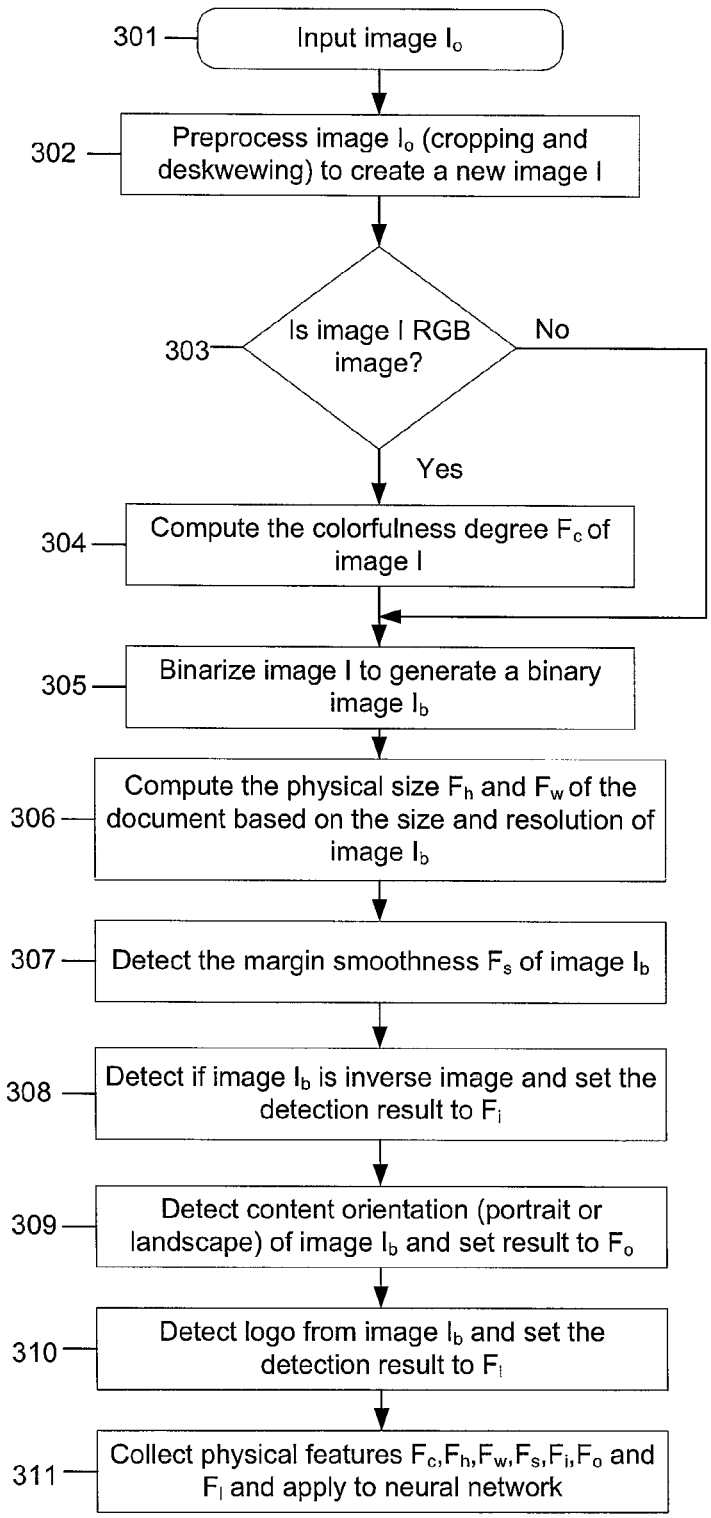
FIG. 3 illustrates a technique for extracting physical features of documents for classification in accordance with the invention.

The process of FIG. 3 starts by providing input image $I_0$, as shown at step 301. Before extracting physical features, the inputted document image $I_0$ is pre-processed at step 302 to remove factors of scanning to create new image i. The most important pre-processing operations are cropping and rotation (or deskewing). Physical features useful for document classification can be document size (physical dimension) and margin smoothness, inversion of images, document content orientation, document colorfulness, text/nontext ratio and logo (or graphical area) existence, for example. A description of each of these features and how to extract them are further described below. Of course, other physical attributes may be extracted within the scope of the invention.

Document Colorfulness

Colorfulness, referred also as chromaticness, is the attribute of a visual sensation according to which the perceived color of an area appears to be more or less chromatic. There are several colorfulness metrics proposed that can be based on the chroma or saturation values in different color space or based on statistical parameters of different color components. For document classification, a simple measurement of colorfulness is enough. For example, if it is determined at step 303 that the input image i is an RGB (color) image, then the colorfulness degree $F_c$ of the image i is calculated at step 304 before proceeding to binarizing the image i at step 305. If the input image i is not an RGB image, then the processing of the input image i proceeds directly to step 305.

The computation of $F_c$ is based on the statistical parameters of rg and yb opponent color components in RGB color space. The colorfulness of image i can be computed at step 304 using the following formula:

$$F_c = \sqrt{\sigma_{rg}^2 + \sigma_{yb}^2} + 0.3\sqrt{\mu_{rg}^2 + \mu_{yb}^2}$$

where: $\sigma$ and $\mu$ are the standard deviation and the mean value of opposite components of the image pixels, respectively. The opposite components are approximated by the following simplified equation:

$$rg = R - G$$

$$yb = 0.5(R+G) - B$$

where R, G and B are the red, green and blue component pixel values in the RGB color space.

At step 305, the image i is binarized to generate binary image $I_b$ for further processing. Techniques for binarization are well-known to those skilled in the art and will not be discussed further here.

Document Size

At step 306, the physical size $F_h$ (horizontal) and $F_v$ (vertical) of the document based on the size and resolution of binary image $I_b$ is calculated. In particular, given the resolution (both horizontal and vertical resolutions), the document size can be easily computed as:

$$W_{doc} = W_{img}/DPI_h$$

$$H_{doc} = H_{img}/DPI_v$$

where $DPI_h$ and $DPI_v$ are horizontal and vertical resolutions, respectively, with unit 'pixel/inch'; $W_{img}$ and $H_{img}$ are document image width and height with unit 'pixel'; and $W_{doc}$ and $H_{doc}$ are the computed physical document width and height with unit 'inch'.

Since the document size is computed directly from the image size, correct cropping of the image is very important for the correct computation of physical document size.

Document Margin Smoothness

If a document is torn off from a larger document, the torn margin of the document is usually not as smooth as the cutting margin of a document. The measurement of the margin smoothness can be a useful feature to distinguish these documents from others. Thus, the margin smoothness $F_s$ of image $I_b$ is detected at step 307.

Instead of directly measuring the smoothness of the document margin, a 'jig-jag degree' is defined that measures and reflects the roughness of the margin. The smaller the value of 'jig-jag degree', the smoother the document margin. The margin of the document is a sequence of numbers. For example, the left margin of the image is represented with a number sequence $[x_0, x_1, \ldots x_{H-1}]$, where $x_i$ (i=0, ..., H-1) is the column on which the first non-background pixel appears on row i, and H is the image height. It should be noted that the background here is not the background of document content but the background (usually a black component) caused by scanning. The computation of the left margin 'jig-jag degree' is described as follows:

1. Compute the average position of margin as $$\mu = \frac{1}{H}\sum_{i=0}^{H-1} x_i.$$

2. Compute the standard deviation of the margin as $$\sigma = \frac{1}{H}\sqrt{\sum_{i=0}^{H-1}(x_i - \mu)^2}.$$

3. If $\sigma < T$, where T is a predefined threshold, then the 'jig-jag degree' is 0; stop the computation.

4. Convert the number sequence to a sequence of numbers with only values 0, −1 and 1 as follows:

$$X_i = \begin{cases} -1 & \text{if } x_i < \mu \\ 0 & \text{if } x_i = \mu \\ 1 & \text{if } x_i > \mu \end{cases}$$

5. Count the total number $N_{seq}$ of continuous 1, −1 and 0 sequences in the converted number sequence. For example, the $N_{seq}$ value of the converted sequence 1110-1-1-10011 is 5 ($N_{seq}$ is set to one and starting at the second element is incremented every time a number is different than the previous number). If the value of $N_{seq}$ is smaller than 4, most likely the large standard deviation $\sigma$ is caused by the skew of the document image. Therefore, the 'jig-jag degree' is 0; stop the computation.

6. Compute the 'jig-jag degree' using the following formula:

$$D_{jig\text{-}jag} = \begin{cases} 100 & \text{if } \sigma \geq 100 \\ \sigma & \text{if } \sigma < 100 \\ 0 & \text{if } \sigma < T \end{cases}$$

Figure 4A:
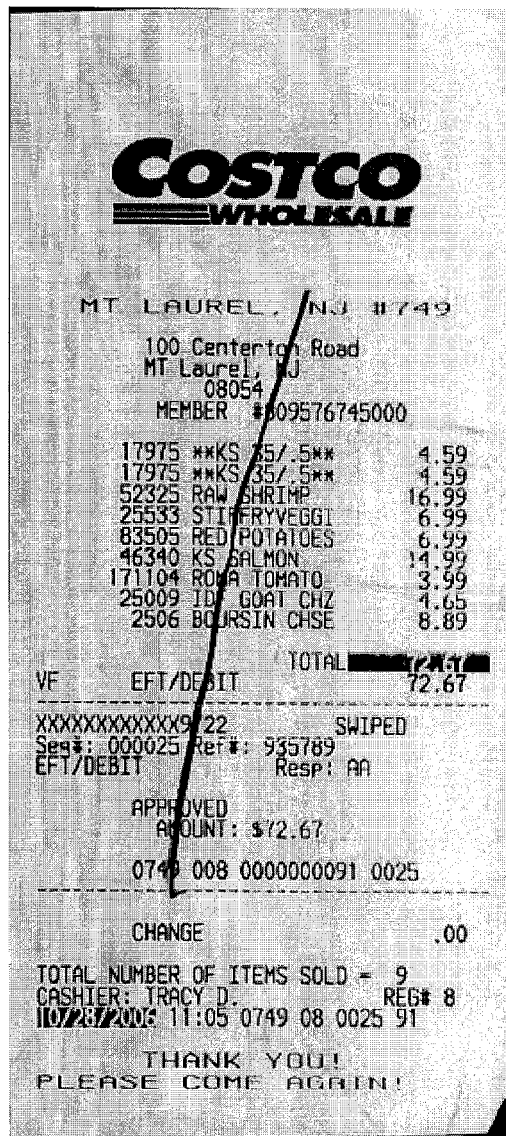
FIGS. 4A, 4B and 4C respectively illustrate a receipt with jig-jag degree 0, 46, and 100 as calculated using a technique for determining document margin smoothness in accordance with the techniques of the invention.
Figure 4B:
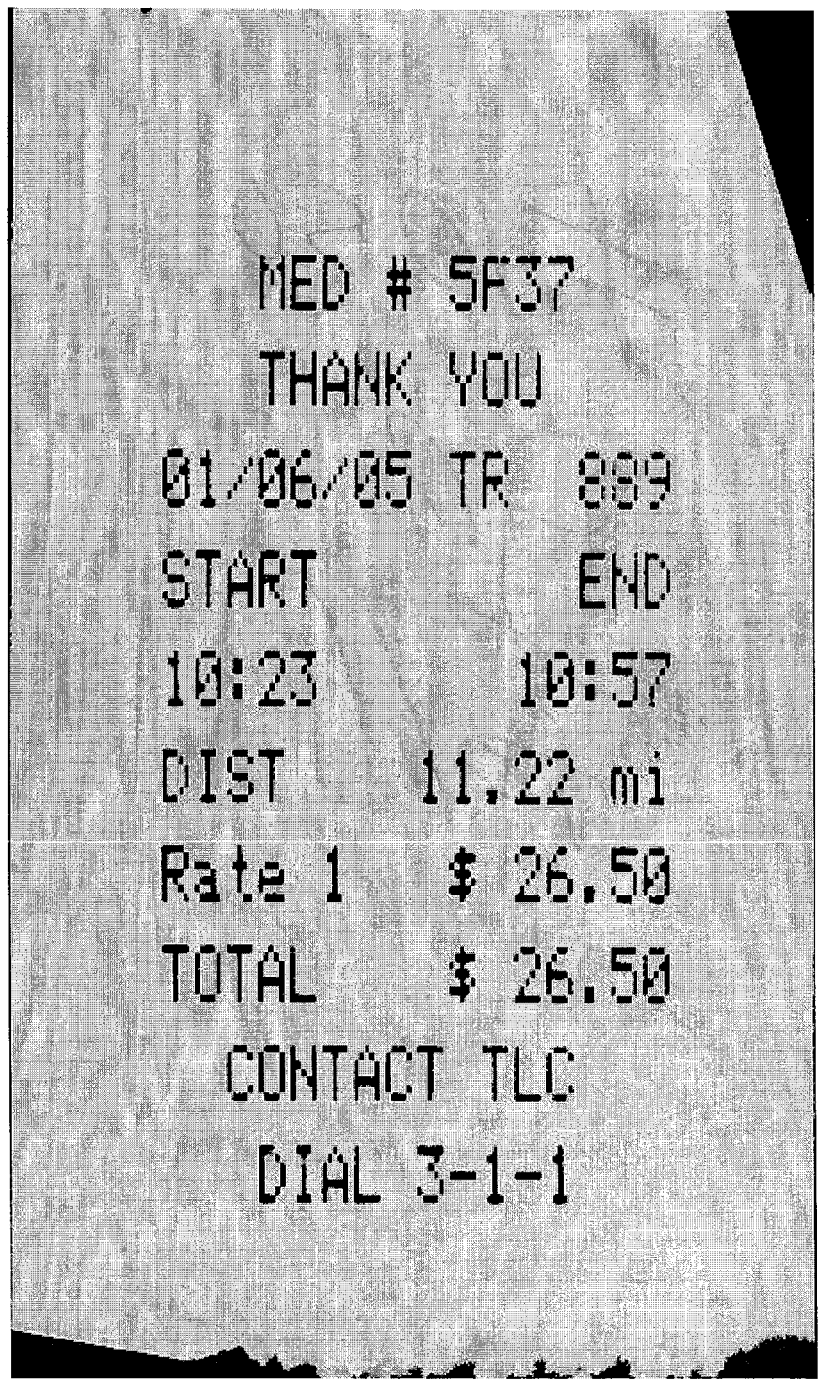
Figure 4C:
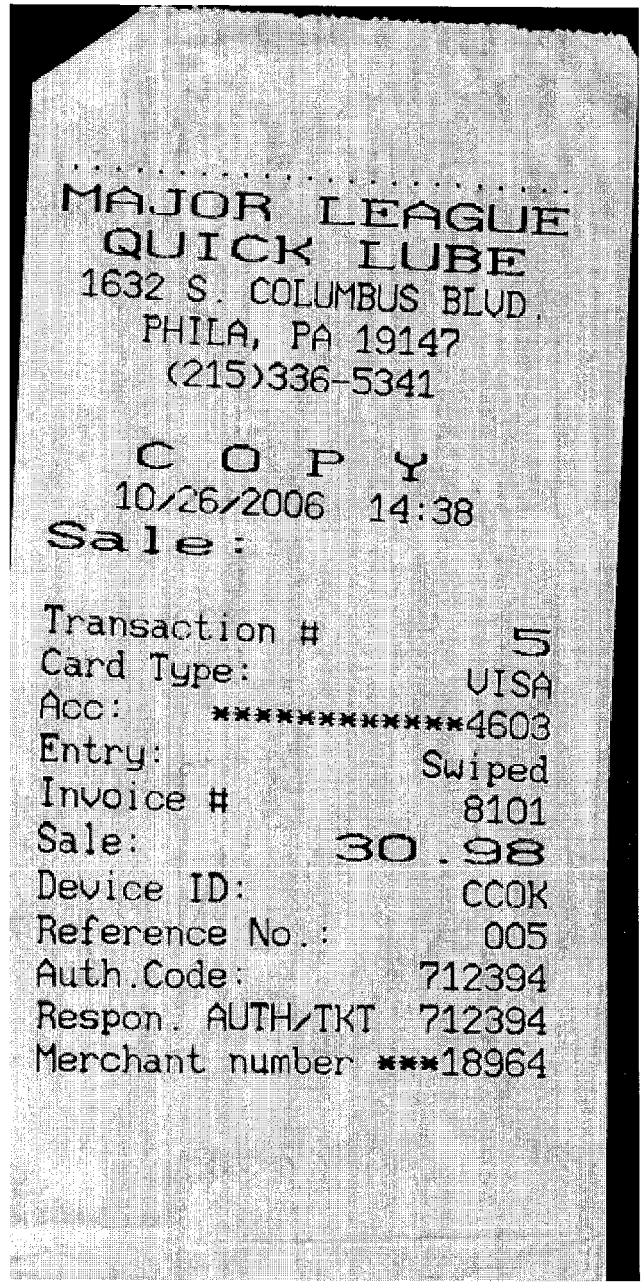

The 'jig-jag degree' corresponds to the margin smoothness $F_s$. By way of example, FIGS. 4A, 4B, and 4C illustrate 'jig-jag degrees' of 0, 46, and 100, respectively.

Inverse Image Detection

At step 308, the image $I_b$ is processed to determine if it is an inverse image. The detection of the inverse image is based on the binary image and the detection result is set to $F_i$. The input document image $I_0$ is first converted to a binary image $I_b$ using a locally-adaptive binarization approach with post-processing. Then the black pixel number $P_{black}$ and the white pixel number $P_{white}$ are counted from the binary image. Only when $P_{black} < P_{white}$, will the input image be considered an inverse image and be inverted. It should be pointed out that the approach only works on images that contain all inverse content. Therefore, it will fail if the original document contains only a part of inverse content.

Document Orientation

At step 309, the document orientation (portrait or landscape) of image $I_b$ is detected and set to $F_o$. Projection profiles and vertical and horizontal variances are effective features to detect document orientation. Approaches based on these features can be basically categorized into global variance based and local variance based approaches. Experimental results show images consisting mostly of non-textual data such as blanks, graphics, forms, line art, large fonts and dithered images did not work well using the global variance based approach. Therefore, a local variance based approach was applied for the page orientation detection with modifications. Since the detection requires features extracted from binary images, the binary image generated when detecting the inverse image is kept for the orientation detection. After defining three thresholds (minBlackLength=DPI/20, maxBlackLength=DPI/5 and minWhiteLength=DPI/50), where DPI is the image resolution with unit 'pixel/inch', the procedure of document orientation detection at step 309 is as follows:

1. Divide document into non-overlapping square windows with size N×N.
2. Ignore non-textual windows which are decided based on black/white pixel ratio and black runs.
3. Compute the horizontal and vertical projection profiles for each textual window. Then check the black and white stripes on each projection profile and decide if it has a 'black-and-white text pattern' based on the following criteria:
   (a) All black stripe lengths are greater than or equal to minBlackLength and less than or equal to maxBlackLength.
   (b) All white stripe lengths are greater than or equal to min WhiteLength.
   (c) The maximum of a white stripe length is less than or equal to twice the minimum of a white stripe length.
4. Make decision based on the detection result of the last step as follows:
   (a) If only a horizontal projection profile has 'black-and-white text pattern' then the square is in portrait mode.
   (b) If only a vertical projection profile has 'black-and-white text pattern' then the square is in landscape mode.
   (c) If neither horizontal nor vertical projection profile has 'black-and-white text pattern', then the corresponding window should be considered as a non-textual area and be ignored.
   (d) If both the vertical and horizontal profiles have 'black-and-white text pattern' then the decision is made in the next step.
5. Compute the squared sums of the horizontal and vertical projection profiles $S_h$ and $S_v$, respectively, as follows:

$$S_h = \sum_{i=0}^{N} h_i^2$$

$$S_v = \sum_{i=0}^{N} v_i^2$$

where $h_i$ and $v_i$ are the horizontal and vertical projection profiles, respectively. The square orientation is then decided as follows:

$$\text{Orientation} = \begin{cases} \text{portrait} & \text{if } S_h > S_v \\ \text{landscape} & \text{if } S_h < 0.6 S_v \\ \text{undecided} & \text{otherwise.} \end{cases}$$

Figure 5A:
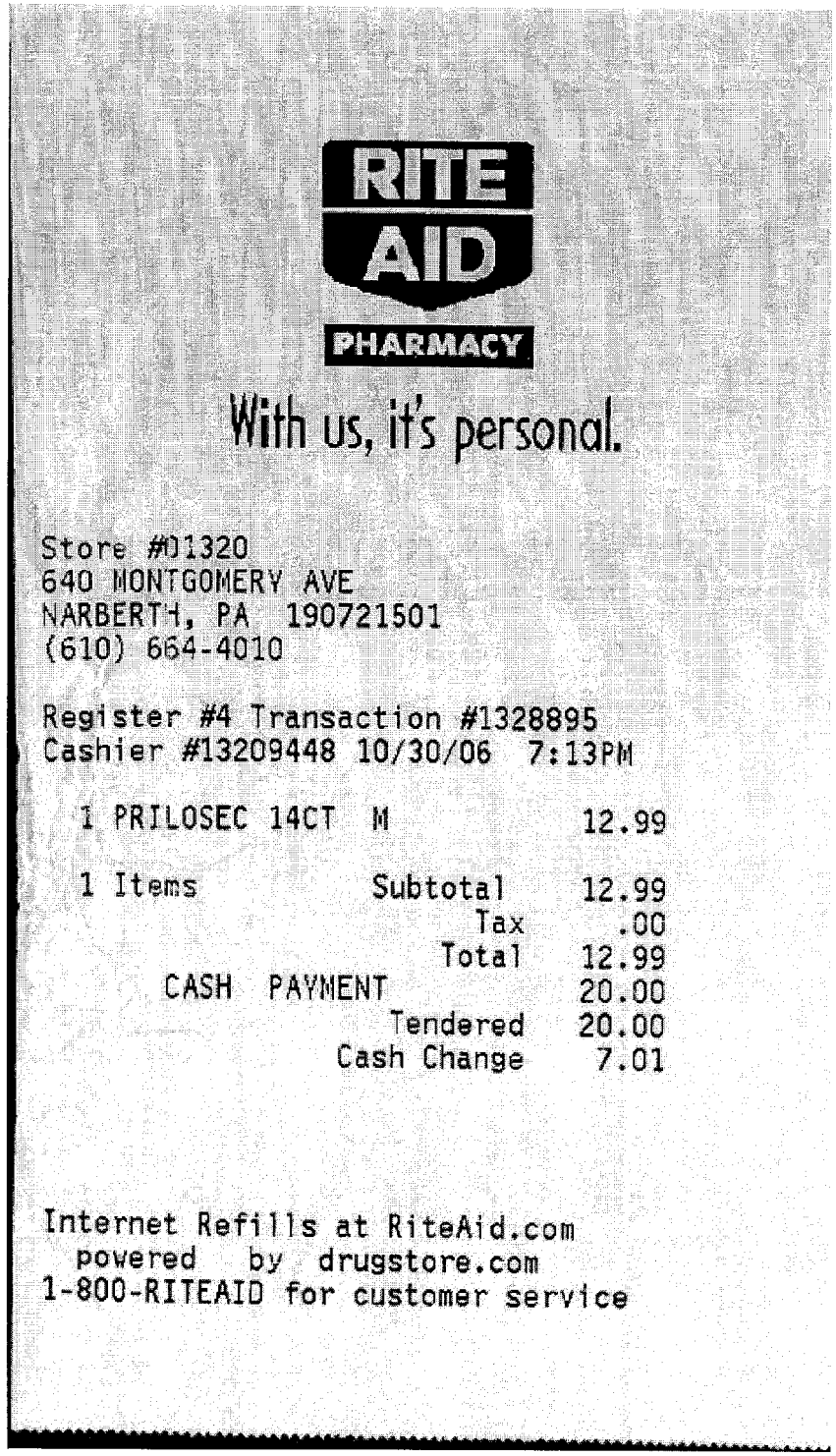
FIG. 5A illustrates a receipt in a portrait orientation.
Figure 5B:
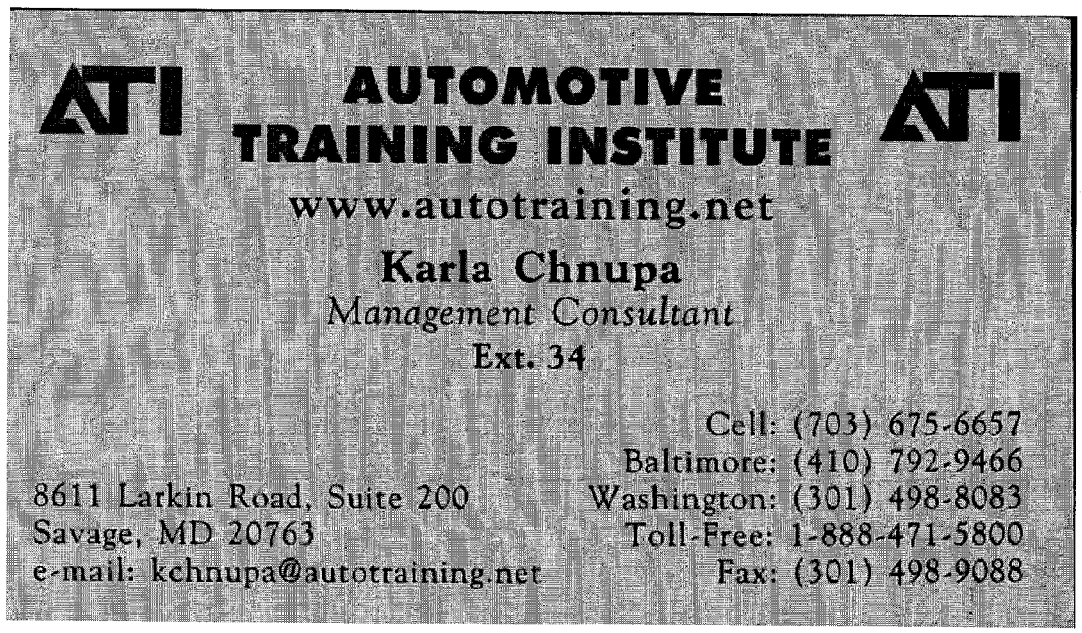
FIG. 5B illustrates a business card in a landscape orientation.

After obtaining the orientation result of each window, the final document orientation is decided using a majority voting approach, where each valid window votes its decision result using black pixel number as the voting weight. FIG. 5A illustrates a receipt in portrait format, while FIG. 5B illustrates a business card in landscape format.

Logo Detection

Logo detection can be a complex process. However, the logo detection approach employed in step 310 is a simple version that is based on component number, size and coverage relations between components. The black components are extracted from the binary image, and the following thresholds are defined:

minComponentDim=20 minLogoWidth=50 minLogoHeight=50 maxLogoWidth=$W$/3 maxLogoHeight=$H$/3 where W and H are the image width and height, respectively. Only components with the width in the range of [minLogoWidth, maxLogoWidth] and the height in the range of [minLogoHeight, maxLogoHeight] are considered logo component candidates. After obtaining the list of logo component candidates, the detection of logos proceeds as follows:

1. For each logo component candidate, count the number of components covered by it. Both the width and height of the component that is taken into account must be larger than minComponentDim, and the coverer component does not have to be a component in the logo candidate list.
2. If the counted number in the above step is larger than 1, then the larger component is a logo. Otherwise, go to the next step.
3. Count the number of holes ($N_{hole}$) inside the component. If $N_{hole} \leq 3$, then the component is not a logo component. If $N_{hole} > 3$, then go to the next step for further checking.

4. Count the total number of pixels covered by these holes ($P_{hole}$) and compare it with the number of pixels covered by the component ($P_{comp}$), then make the decision as follows:

$$\text{Component} = \begin{cases} \text{logo} & \text{if } P_{hole} \leq \frac{1}{4} P_{comp} \\ \text{notlogo} & \text{if } P_{hole} < \frac{1}{4} P_{comp} \end{cases}$$

Figure 6A:
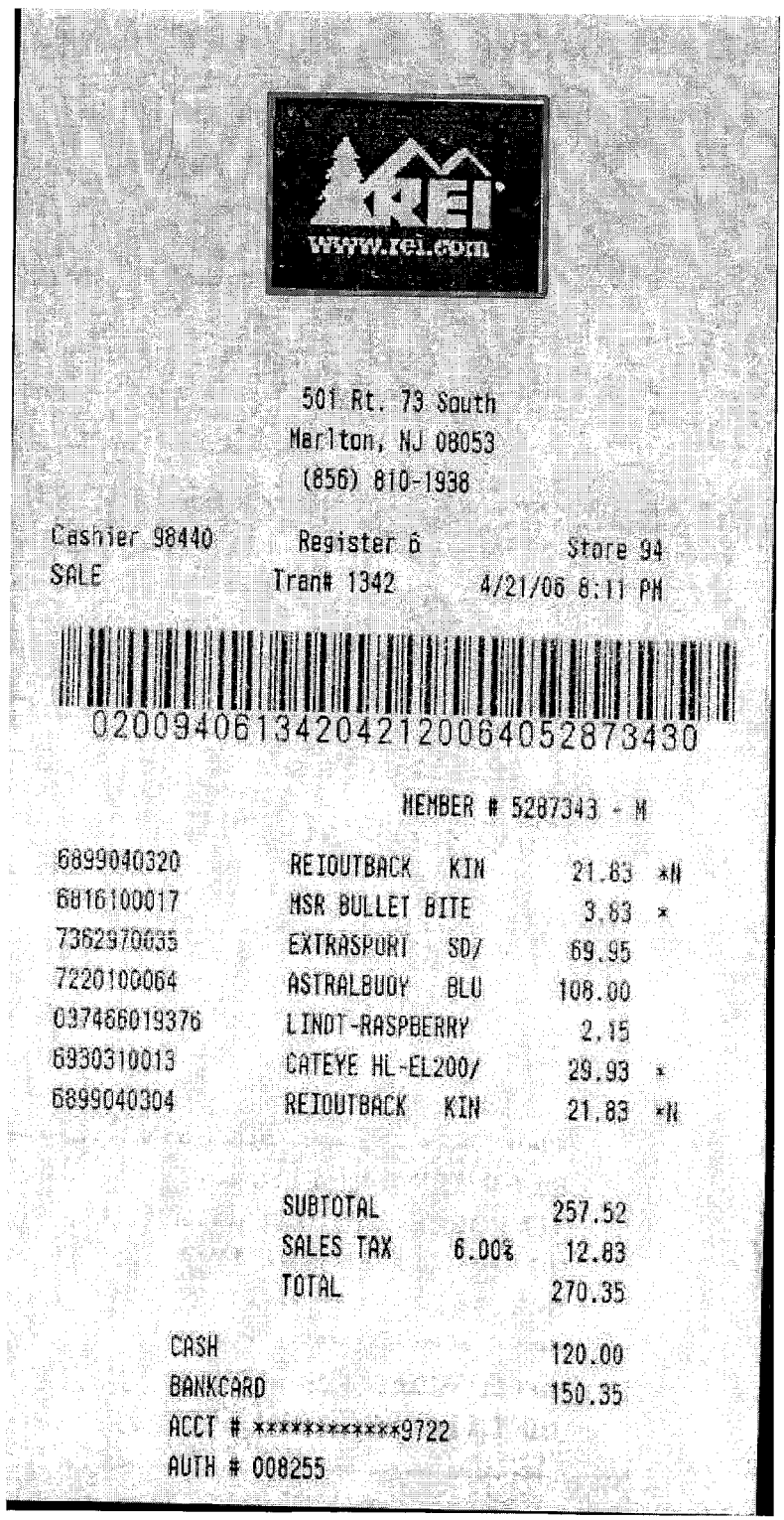
FIG. 6A illustrates a receipt with a logo for detection using the techniques of the invention.
Figure 6B:
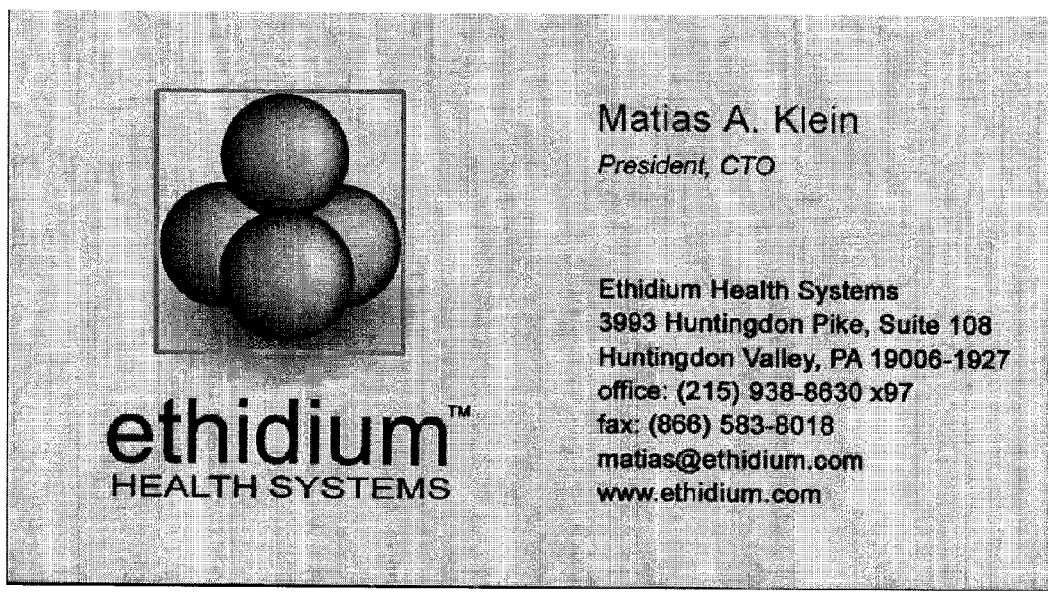
FIG. 6B illustrates a business card with a logo for detection using the techniques of the invention.

The result of the logo detection is set to $F_l$. Sample logos 600 and 601 are shown in FIGS. 6A and 6B for a receipt and a business card, respectively.

Text/Nontext Ratio

Optionally, a 'text/nontext ratio' is also computed. Text area contains all black components except logo components and background components caused by scanning. Nontext area contains all white components and logo components. The ratio is computed as:

$$R = P_{text}/P_{nontext}$$

where $P_{text}$ is the number of text pixels, and $P_{nontext}$ is the number of nontext pixels.

Input Standardization

The resulting physical features $F_c$, $F_h$, $F_w$, $F_s$, $F_i$, $F_o$ and $F_l$ from the above processing are collected and applied to a neural network at step 311 with or without the lexical features for performing the document classifications. However, due to the high variance and range of the feature information, it is necessary to standardize the input vector X including such features before training the neural network. To accomplish this task, the input vector X is standardized to a mean of 0 and a standard deviation of 1 using the following algorithm:

Algorithm Input Standardization

1: Compute $m = \dfrac{\sum_{i=1}^{N} X_1}{N}$

2: Compute $std = \sqrt{\dfrac{\sum_{i=1}^{N} (X_i - m)^2}{N-1}}$

3: for all $X_i$ in $X$ do

4: $S_i = \dfrac{X_i - m}{std}$

5: end for where $X_i$ is the $i_{th}$ input value in input vector X, N is the number of training samples, and $S_i$ is the standardized input corresponding to $X_i$.

Document Classification

The process of document classification involves taking an input vector X and classifying it as $c_i \in C\{c_1, c_2, \ldots, c_i\}$. The classification task can be accomplished using any number of machine learning or statistical approaches such as Support Vector Machines, Vector Space Cosine Similarity, or Data Clustering. In an exemplary embodiment, a supervised neural network was used and trained according to the ARPROP algorithm.

Neural Network

A standard feedforward network architecture (with bias nodes) was used in an exemplary embodiment. The neural network contained an input layer, 2 hidden layers, and an output layer. The input layer consisted of 80 nodes, both hidden layers contained 20 nodes, and the output layer contained 3 nodes (one for each $c_i \in C$). A bipolar sigmoid activation function with a range of (−1, 1) defined as:

$$f(x) = \frac{2}{1 + \exp(-x)} - 1$$

$$f'(x) = \frac{1}{2}[1 + f(x)][1 - f(x)]$$

was used for all nodes in the hidden layer. The result was a classification of documents including not only the standard lexical components of the documents but also the physical features of the documents as described herein. As noted above, sample document classifications may include receipts, business cards, letters, and the like, while the lexical contents of the documents may be used in a conventional manner to further divide the classifications into sub-classifications.

As is apparent from the above, all or portions of the various systems, methods, and aspects of the present invention may be embodied in hardware, software, or a combination of both. When embodied in software, the methods and apparatus of the present invention, or certain aspects or portions thereof, may be embodied in the form of program code (i.e., instructions). This program code may be stored on a computer-readable medium, such as a magnetic, electrical, or optical storage medium, including without limitation a floppy diskette, CD-ROM, CD-RW, DVD-ROM, DVD-RAM, magnetic tape, flash memory, hard disk drive, or any other machine-readable storage medium, wherein, when the program code is loaded into and executed by a machine, such as a computer or server, the machine becomes an apparatus for practicing the invention. A computer on which the program code executes will generally include a processor, a storage medium readable by the processor (including volatile and non-volatile memory and/or storage elements), at least one input device, and at least one output device. The program code may be implemented in a high level procedural or object oriented programming language. Alternatively, the program code can be implemented in an assembly or machine language. In any case, the language may be a compiled or interpreted language. When implemented on a general-purpose processor, the program code may combine with the processor to provide a unique apparatus that operates analogously to specific logic circuits.

Moreover, the invention can be implemented in connection with any computer or other client or server device, which can be deployed as part of a computer network, or in a distributed computing environment. In this regard, the present invention pertains to any computer system or environment having any number of memory or storage units, and any number of applications and processes occurring across any number of storage units or volumes, which may be used in connection with processes for improving image processing in accordance with the present invention. The present invention may apply to an environment with server computers and client computers deployed in a network environment or distributed computing environment, having remote or local storage. The present invention may also be applied to standalone computing devices, having programming language functionality, interpretation and execution capabilities for generating, receiving and transmitting information in connection with remote or local services.

Distributed computing facilitates sharing of computer resources and services by exchange between computing devices and systems. These resources and services include, but are not limited to, the exchange of information, cache storage, and disk storage for files. Distributed computing takes advantage of network connectivity, allowing clients to leverage their collective power to benefit the entire enterprise. In this regard, a variety of devices may have applications, objects or resources that may implicate processing performed in connection with the image processing using the methods of the present invention.

Although not required, the invention can be implemented via an operating system, and/or included within application or server software that operates in accordance with the invention. Software may be described in the general context of computer-executable instructions, such as program modules, being executed by one or more computers, such as client workstations, servers or other devices. Generally, program modules include routines, programs, objects, components, data structures and the like that perform particular tasks or implement particular abstract data types. Typically, the functionality of the program modules may be combined or distributed as desired in various embodiments. Moreover, the invention may be practiced with other computer system configurations and protocols. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, appliances, lights, environmental control elements, minicomputers, mainframe computers and the like.

Those skilled in the art will appreciate that other physical and/or lexical features and attributes besides those described herein may be used in accordance with the techniques described herein. Such variations are intended to be included within the scope of the invention as defined by the following claims.

What is claimed:

1. A method for classifying a scanned document, comprising:
   extracting non-graphical physical attributes of the scanned document using a processor programmed to extract said physical attributes, said non-graphical physical attributes excluding graphical attributes relating to the way content is organized and displayed within the scanned document; and
   classifying the scanned document based on the extracted physical attributes of the scanned document.

2. The method of claim 1, further comprising:
   creating an input vector from the extracted physical attributes; and
   providing the input vector to a processing system to train the processing system to classify the document from one or more features of the input vector.

3. The method of claim 2, wherein extracting the physical attributes of the scanned document comprises cropping and/or rotating the scanned document as needed to create a processed scanned document for feature extraction.

4. The method of claim 3, wherein extracting physical attributes of the scanned document comprises extracting the size of the processed scanned document.

5. The method of claim 3, wherein extracting physical attributes of the scanned document comprises detecting the margin smoothness of the processed scanned document.

6. The method of claim 5, wherein detecting the margin smoothness of the processed scanned document comprises calculating a jig jag degree ($D_{jig\text{-}jag}$) by computing an average position of a margin of the document, computing a standard deviation of the margin, converting the margin into a sequence of numbers with values of 0, −1, and 1 as follows:

$$X_i = \begin{cases} -1 & \text{if } x_i < \mu \\ 0 & \text{if } x_i = \mu \\ 1 & \text{if } x_i > \mu, \end{cases}$$

counting the total number $N_{seq}$ of continuous 1, −1, and 0 sequences in the converted number sequence, and computing $D_{jig\text{-}jag}$ as:

$$D_{jig\text{-}jag} = \begin{cases} 100 & \text{if } \sigma \geq 100 \\ \sigma & \text{if } \sigma < 100 \\ 0 & \text{if } \sigma < T. \end{cases}$$

7. The method of claim 3, wherein the extracting of physical attributes of the scanned document comprises detecting the colorfulness of the scanned document.

8. The method of claim 3, wherein the extracting of physical attributes of the scanned document comprises detecting whether the image is an inverse image of the scanned document.

9. The method of claim 3, wherein the extracting of physical attributes of the scanned document comprises detecting whether the scanned document is in a portrait or a landscape orientation.

10. The method of claim 9, wherein detecting whether the scanned document is in a portrait or a landscape orientation comprises:
   defining three thresholds: minimum black length, maximum black length, and minimum white length;
   dividing the scanned document into non-overlapping square windows each with size N×N;
   ignoring windows without text;
   computing horizontal and vertical projection profiles for each window with text;
   checking black and white stripes on each projection profile and deciding if each black and white stripe has a black-and-white text pattern whereby all black stripe lengths are greater than or equal to the minimum black length and less than or equal to the maximum black length, all white stripe lengths are greater than or equal to the minimum white stripe length, and the maximum of a white stripe length is less than or equal to twice the minimum of a white stripe length;
   determining from the black and white stripe check whether a horizontal projection profile has a black and white text pattern and, if so, determining that the window is in portrait mode;
   determining from the black and white stripe check whether a vertical projection profile has a black and white text pattern and, if so, determining that the window is in landscape mode;
   computing the squared sums of the horizontal and vertical projection profiles $S_h$ and $S_v$, respectively, as follows:

$$S_h = \sum_{i=0}^{N} h_i^2$$

-continued $$S_v = \sum_{i=0}^{N} v_i^2$$

where $h_i$ and $v_i$ are the horizontal and vertical projection profiles, respectively;

determining the window orientation as follows:

$$\text{Orientation} = \begin{cases} \text{portrait} & \text{if } S_h > S_v \\ \text{landscape} & \text{if } S_h < 0.6 S_v \\ \text{undecided} & \text{otherwise} \end{cases} ; \text{ and}$$

determining the scanned document's orientation using a majority voting approach using the orientation result of each window, where each window votes its decision result using a pixel number as its voting weight.

11. The method of claim 3, wherein the extracting of physical attributes of the scanned document comprises detecting the presence of a logo in the scanned document.

12. The method of claim 11, wherein detecting the presence of a logo in the scanned document comprises:
    identifying logo component candidates;
    for each logo component candidate, counting the number of components covered by the logo component candidate;
    if the number of components covered by the logo component candidate is greater than 1, then determining that the logo component candidate is a logo;
    if the number of components covered by the logo component candidate is not greater than 1, counting the number of holes ($N_{hole}$) inside the logo component candidate;
    if $N_{hole}$ is less than or equal to 3, then determining that the logo component candidate is not a logo;
    if $N_{hole}$ is greater than 3, then counting the total number of pixels covered by the holes ($P_{hole}$) and comparing a number of pixels covered by the component; and
    determining that the component is or is not a logo component as follows:

$$\text{Component} = \begin{cases} \text{logo} & \text{if } P_{hole} \leq \frac{1}{4} P_{comp} \\ \text{notlogo} & \text{if } P_{hole} < \frac{1}{4} P_{comp} \end{cases}.$$

13. The method of claim 3, wherein the extracting of physical attributes of the scanned document comprises computing a text/nontext ratio of the scanned document.

14. The method of claim 2, further comprising collecting the physical attributes for the input vector, selecting at least one physical attribute from the collected physical attributes that describes a target class of said scanned document, and identifying the selected at least one physical attribute and target class to said processing system.

15. The method of claim 14, wherein the target class of said scanned document comprises either a receipt or a business card.

16. The method of claim 2, further comprising extracting lexical features from the scanned document, combining the extracted lexical features and extracted physical attributes into a unified set of features, and providing the unified set of features to the processing system to classify the scanned document.

17. A non-transitory computer readable storage medium having instructions stored thereon that when executed by a processor causes said processor to implement a method for classifying a scanned document, said method comprising:
    extracting non-graphical physical attributes of the scanned document, said non-graphical physical attributes excluding graphical attributes relating to the way content is organized and displayed within the scanned document; and
    classifying the scanned document based on the extracted physical attributes of the scanned document.

18. The medium of claim 17, further comprising instructions for:
    creating an input vector from the extracted physical attributes; and
    providing the input vector to a processing system to train the processing system to classify the document from one or more features of the input vector.

19. The medium of claim 18, wherein the instructions for extracting the physical attributes of the scanned document comprises instructions for cropping and/or rotating the scanned document as needed to create a processed scanned document for feature extraction.

20. The medium of claim 19, wherein the instructions for extracting physical attributes of the scanned document comprises instructions for extracting the size of the processed scanned document.

21. The medium of claim 19, wherein the instructions for extracting physical attributes of the scanned document comprises instructions for detecting the margin smoothness of the processed scanned document.

22. The medium of claim 21, wherein the instructions for detecting the margin smoothness of the processed scanned document comprises instructions for calculating a jig-jag degree ($D_{jig\text{-}jag}$) by computing an average position of a margin of the document, computing a standard deviation of the margin, converting the margin into a sequence of numbers with values of 0, −1, and 1 as follows:

$$X_i = \begin{cases} -1 & \text{if } x_i < \mu \\ 0 & \text{if } x_i = \mu \\ 1 & \text{if } x_i > \mu, \end{cases}$$

counting the total number $N_{seq}$ of continuous 1, −1, and 0 sequences in the converted number sequence, and computing $D_{jig\text{-}jag}$ as:

$$D_{jig\text{-}jag} = \begin{cases} 100 & \text{if } \sigma \geq 100 \\ \sigma & \text{if } \sigma < 100 \\ 0 & \text{if } \sigma < T. \end{cases}$$

23. The medium of claim 19, wherein the instructions for extracting of physical attributes of the scanned document comprises instructions for detecting the colorfulness of the scanned document.

24. The medium of claim 19, wherein the instructions for extracting of physical attributes of the scanned document comprises instructions for detecting whether the image is an inverse image of the scanned document.

25. The medium of claim 19, wherein the instructions for extracting of physical attributes of the scanned document comprises instructions for detecting whether the scanned document is in a portrait or a landscape orientation.

26. The medium of claim 25, wherein the instructions for detecting whether the scanned document is in a portrait or a landscape orientation comprises instructions for:
defining three thresholds: minimum black length, maximum black length, and minimum white length;
dividing the scanned document into non-overlapping square windows each with size N×N;
ignoring windows without text;
computing horizontal and vertical projection profiles for each window with text;
checking black and white stripes on each projection profile and deciding if each black and white stripe has a black-and-white text pattern whereby all black stripe lengths are greater than or equal to the minimum black length and less than or equal to the maximum black length, all white stripe lengths are greater than or equal to the minimum white stripe length, and the maximum of a white stripe length is less than or equal to twice the minimum of a white stripe length;
determining from the black and white stripe check whether a horizontal projection profile has a black and white text pattern and, if so, determining that the window is in portrait mode;
determining from the black and white stripe check whether a vertical projection profile has a black and white text pattern and, if so, determining that the window is in landscape mode;
computing the squared sums of the horizontal and vertical projection profiles $S_h$ and $S_v$, respectively, as follows:

$$S_h = \sum_{i=0}^{N} h_i^2$$

$$S_v = \sum_{i=0}^{N} v_i^2$$

where $h_i$ and $v_i$ are the horizontal and vertical projection profiles, respectively;
determining the window orientation as follows:

$$\text{Orientation} = \begin{cases} \text{portrait} & \text{if } S_h > S_v \\ \text{landscape} & \text{if } S_h < 0.6 S_v \\ \text{undecided} & \text{otherwise} \end{cases} ; \text{ and}$$

determining the scanned document's orientation using a majority voting approach using the orientation result of each window, where each window votes its decision result using a pixel number as its voting weight.

27. The medium of claim 19, wherein the instructions for extracting of physical attributes of the scanned document comprises instructions for detecting the presence of a logo in the scanned document.

28. The medium of claim 27, wherein the instructions for detecting the presence of a logo in the scanned document comprises instructions for:
identifying logo component candidates;
for each logo component candidate, counting the number of components covered by the logo component candidate;
if the number of components covered by the logo component candidate is greater than 1, then determining that the logo component candidate is a logo;
if the number of components covered by the logo component candidate is not greater than 1, counting the number of holes ($N_{hole}$) inside the logo component candidate;
if $N_{hole}$ is less than or equal to 3, then determining that the logo component candidate is not a logo;
if $N_{hole}$ is greater than 3, then counting the total number of pixels covered by the holes ($P_{hole}$) and comparing a number of pixels covered by the component; and
determining that the component is or is not a logo component as follows:

$$\text{Component} = \begin{cases} \text{logo} & \text{if } P_{hole} \leq \frac{1}{4} P_{comp} \\ \text{notlogo} & \text{if } P_{hole} < \frac{1}{4} P_{comp}. \end{cases}$$

29. The medium of claim 19, wherein the instructions for extracting of physical attributes of the scanned document comprises instructions for computing a text/nontext ratio of the scanned document.

30. The medium of claim 18, further comprising instructions for collecting the physical attributes for the input vector, selecting at least one physical attribute from the collected physical attributes that describes a target class of said scanned document, and identifying the selected at least one physical attribute and target class to said processing system.

31. The medium of claim 30, wherein the target class of said scanned document comprises either a receipt or a business card.

32. The medium of claim 18, further comprising instructions for extracting lexical features from the scanned document, combining the extracted lexical features and extracted physical attributes into a unified set of features, and providing the unified set of features to the processing system to classify the scanned document.

33. A system for classifying a document, comprising:
a scanner that scans and digitizes images on the document;
a processing system adapted to extract non-graphical physical attributes of the scanned document, said non-graphical physical attributes excluding graphical attributes relating to the way content is organized and displayed within the scanned document, and to classify the scanned document based on the extracted physical attributes of the scanned document.

34. The system of claim 33, wherein the processing system is further adapted to create an input vector from the extracted physical attributes and to provide the input vector to a neural network to train the neural network to classify the document from one or more features of the input vector.

35. The system of claim 34, wherein the processing system extracts the physical attributes of the scanned document by cropping and/or rotating the scanned document as needed to create a processed scanned document for feature extraction.

36. The system of claim 35, wherein the processing system extracts physical attributes of the scanned document by extracting the size of the processed scanned document.

37. The system of claim 35, wherein the processing system extracts physical attributes of the scanned document by detecting the margin smoothness of the processed scanned document.

38. The system of claim 37, wherein the processing system detects the margin smoothness of the processed scanned document by calculating a jig-jag degree ($D_{jig\text{-}jag}$) by computing an average position of a margin of the document, computing a standard deviation of the margin, converting the margin into a sequence of numbers with values of 0, −1, and 1 as follows:

$$X_i = \begin{cases} -1 & \text{if } x_i < \mu \\ 0 & \text{if } x_i = \mu \\ 1 & \text{if } x_i > \mu, \end{cases}$$

counting the total number $N_{seq}$ of continuous 1, −1, and 0 sequences in the converted number sequence, and computing $D_{jig\text{-}jag}$ as:

$$D_{jig\text{-}jag} = \begin{cases} 100 & \text{if } \sigma \geq 100 \\ \sigma & \text{if } \sigma < 100 \\ 0 & \text{if } \sigma < T. \end{cases}$$

39. The system of claim 35, wherein the processing system extracts physical attributes of the scanned document by detecting the colorfulness of the scanned document.

40. The system of claim 35, wherein the processing system extracts physical attributes of the scanned document by detecting whether the image is an inverse image of the scanned document.

41. The system of claim 35, wherein the processing system extracts physical attributes of the scanned document by detecting whether the scanned document is in a portrait or a landscape orientation.

42. The system of claim 41, wherein the processing system detects whether the scanned document is in a portrait or a landscape orientation by:
defining three thresholds: minimum black length, maximum black length, and minimum white length;
dividing the scanned document into non-overlapping square windows each with size N×N;
ignoring windows without text;
computing horizontal and vertical projection profiles for each window with text;
checking black and white stripes on each projection profile and deciding if each black and white stripe has a black-and-white text pattern whereby all black stripe lengths are greater than or equal to the minimum black length and less than or equal to the maximum black length, all white stripe lengths are greater than or equal to the minimum white stripe length, and the maximum of a white stripe length is less than or equal to twice the minimum of a white stripe length;
determining from the black and white stripe check whether a horizontal projection profile has a black and white text pattern and, if so, determining that the window is in portrait mode;
determining from the black and white stripe check whether a vertical projection profile has a black and white text pattern and, if so, determining that the window is in landscape mode;
computing the squared sums of the horizontal and vertical projection profiles $S_h$ and $S_v$, respectively, as follows:

$$S_h = \sum_{i=0}^{N} h_i^2$$

$$S_v = \sum_{i=0}^{N} v_i^2$$

where $h_i$ and $v_i$ are the horizontal and vertical projection profiles, respectively;
determining the window orientation as follows:

$$\text{Orientation} = \begin{cases} \text{portrait} & \text{if } S_h > S_v \\ \text{landscape} & \text{if } S_h < 0.6 S_v \text{; and} \\ \text{undecided} & \text{otherwise} \end{cases}$$

determining the scanned document's orientation using a majority voting approach using the orientation result of each window, where each window votes its decision result using a pixel number as its voting weight.

43. The system of claim 35, wherein the processing system extracts physical attributes of the scanned document by detecting the presence of a logo in the scanned document.

44. The system of claim 43, wherein the processing system detects the presence of a logo in the scanned document by:
identifying logo component candidates;
for each logo component candidate, counting the number of components covered by the logo component candidate;
if the number of components covered by the logo component candidate is greater than 1, then determining that the logo component candidate is a logo;
if the number of components covered by the logo component candidate is not greater than 1, counting the number of holes ($N_{hole}$) inside the logo component candidate;
if $N_{hole}$ is less than or equal to 3, then determining that the logo component candidate is not a logo;
if $N_{hole}$ is greater than 3, then counting the total number of pixels covered by the holes ($P_{hole}$) and comparing a number of pixels covered by the component; and
determining that the component is or is not a logo component as follows:

$$\text{Component} = \begin{cases} \text{logo} & \text{if } P_{hole} \leq \frac{1}{4} P_{comp} \\ \text{notlogo} & \text{if } P_{hole} < \frac{1}{4} P_{comp}. \end{cases}$$

45. The system of claim 35, wherein the processing system extracts physical attributes of the scanned document by computing a text/nontext ratio of the scanned document.

46. The system of claim 34, wherein the processing system further collects the physical attributes for the input vector, selects at least one physical attribute from the collected physical attributes that describes a target class of said scanned document, and identifies the selected at least one physical attribute and target class to said neural network.

47. The system of claim 46, wherein the target class of said scanned document comprises either a receipt or a business card.

48. The system of claim 34, wherein the processing system further extracts lexical features from the scanned document, combines the extracted lexical features and extracted physical attributes into a unified set of features, and provides the unified set of features to the neural network to classify the scanned document.

* * * * *